Dec. 2, 1941.      J. C. GRIFFITH      2,264,694
ROTARY STABILIZER AND METHOD OF BALANCING THE SAME
Filed May 10, 1939
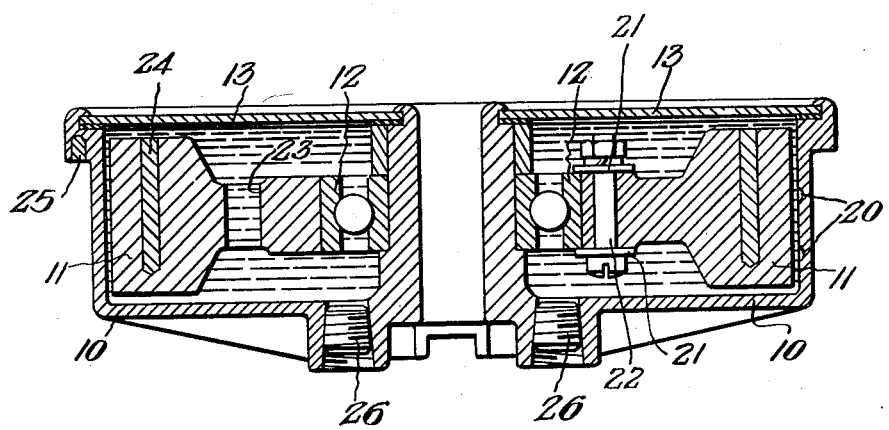
Inventor
John C. Griffith
Attorney Patented Dec. 2, 1941

2,264,694

UNITED STATES PATENT OFFICE 2,264,694

ROTARY STABILIZER AND METHOD OF BALANCING THE SAME

John C. Griffith, Indianapolis, Ind., assignor to Radio Corporation of America, a corporation of Delaware Application May 10, 1939, Serial No. 272,844

2 Claims. (Cl. 74—573)

This invention relates to an improved rotary stabilizer and an improved method of balancing the same. The rotary stabilizer is a device which finds its greatest present commercial use in connection with film sound reproducing and recording apparatus, and in one form includes a light casing rigidly connected to a shaft, the movement of which is to be stabilized, and a massive freely rotatable member within the casing coupled in a continuously and aperiodically yieldable manner to the casing.

The rotating mass is in some forms of the invention a body of mercury or other heavy fluid, or it may be a solid member such as a freely rotatable flywheel coupled to the casing by a viscous fluid such as oil of an appropriate viscosity, such, for example, as a light machine oil.

The present invention pertains particularly to the balancing both of the casing and of the flywheel in the latter species of the device in such a manner as to compensate for holes in the castings and in such a manner that the flywheel may be statically balanced in air and will remain statically balanced when immersed in oil, and the casing may likewise be balanced independently of the effect of oil filling any holes in the casing.

One object of the invention is to provide an improved rotary stabilizer.

Another object of the invention is to provide a rotary stabilizer wherein the freely rotatable member is perfectly balanced.

Another object of the invention is to provide a rotary stabilizer wherein the casing is perfectly balanced independently of its oil content.

Another object of the invention is to provide an improved method of balancing a rotatable member adapted to operate in a fluid.

Other and incidental objects of the invention will be apparent to those skilled in the art from a reading of the following specification and an inspection of the accompanying drawing in which:

The single figure represents a rotary stabilizer in section.

Referring now to the drawing, the rotary stabilizer includes a casing 10 which is composed of some appropriate material such as an aluminum alloy or a magnesium alloy. This casing is preferably cast to shape and is machined inside to the required dimensions. The central hole through the casing is adapted to fit the shaft to which the device is intended to be secured and the device may be secured to the shaft and used in the manner described and claimed in Loomis et al. Patent No. 2,019,147. An appropriate cover 13 is provided for the casing which may be spun in place, as shown in the drawing. Within the casing and mounted on the central portion thereof there is carried a flywheel 11 supported by the ball bearing 12. The flywheel is held on the outer case of the ball bearing 12 by the washers 21 which are held firmly against both the flywheel and the ball case by the bolt 22. As many bolts 22 and pairs of washers 21 may be used as are necessary, equally spaced around the bearing. The web of the flywheel may be provided with holes as indicated at 23 equally spaced around the wheel to decrease the weight thereof without materially decreasing the circumferential momentum. Since the holes 23 and the bolts 22 are all equally spaced around the center bearing, the flywheel web presents a symmetrical geometric appearance. These parts are so constructed that the flywheel is accurately concentric with the inner circumference of the casing, as well as with the supporting shaft.

After the device is assembled, light oil is inserted through the holes 26 which are thereafter appropriately plugged, as shown.

In order for the apparatus to function properly, it is necessary that both the casing and the flywheel be balanced about the center of the shaft. This was accomplished in the prior art by drilling holes in the casing and by drilling holes in the heavy side of the flywheel. In addition to these holes, gas holes occasionally occurred in the castings, as indicated at 20. When a device thus balanced was assembled, oil would enter the holes which had been drilled and would effectively increase the weight of the elements at such portions, thereby rendering accurate balancing difficult.

In order to avoid these difficulties, I first balance the flywheel by drilling holes of appropriate diameter and depth as indicated at 24 in the light side thereof and then fill these holes with lead or solder. For example, the holes may be made ⅛ of an inch in diameter and then filled with ⅛ of an inch wire solder, which is trimmed off flush with the surface of the flywheel. The reason for using solder is that it is readily available commercially in wire form. Lead or aluminum 24' may be used either in a similar manner or the holes may be poured full of molten metal, or holes may be drilled and plugged at their outer ends, the important feature being that the holes are completely closed, so that proper balance is secured with no change in fluid displacement. It will be apparent that the drilling of a hole and filling it with a material of greater density than the flywheel as the lead at 24 will make that side of the flywheel heavier, while, conversely, the drilling of a hole in the flywheel and filling it with a lighter material as aluminum at 24' will make that side of the flywheel lighter. It will be apparent that when a flywheel thus balanced is immersed in oil or other fluid, its balance will not be affected as the original geometrical symmetry has not been disturbed by the balancing operation which renders the flywheel massively symmetrical.

In order to balance the casing, I first assemble the balanced flywheel within the casing and spin the cover in place, after which the casing is filled with oil and the plugs 26 inserted. The assembled rotary stabilizer is then placed on a suitable accurate arbor which, in turn, is placed on knife edges and the casing is balanced by drilling holes as indicated at 25 on the light side of the casing and plugging these holes with solder or lead. Since this balancing operation is accomplished after the casing is filled with oil, the balancing will compensate for any lack of balance due to gas holes, such as indicated at 20, being filled with oil and the filling of the holes 25 with the material of greater density will prevent any subsequent change in balance due to foreign material, such as dirt or paint, accumulating in uncovered holes.

I claim as my invention:

1. A rotary stabilizer including a casing adapted to be carried on a member rotatable about an axis, a flywheel mounted within said casing for free rotation about said axis, and a liquid within said casing coupling said flywheel and said casing, said flywheel comprising a member geometrically externally symmetrical radially of said axis but massively unsymmetrical about said axis, said member having portions thereof replaced by balancing elements of material of different density rendering said member massively symmetrical while maintaining geometric symmetry.

2. A rotary stabilizer including a casing adapted to be carried on a member rotatable about an axis, a flywheel mounted within said casing for free rotation about said axis, and a liquid within said casing coupling said flywheel and said casing, said flywheel comprising a member geometrically externally symmetrical radially of said axis but massively unsymmetrical about said axis, said member having portions thereof replaced by balancing elements of material of different density rendering said member massively symmetrical while maintaining geometric symmetry, said casing being also geometrically externally symmetrical radially of said axis but massively unsymmetrical about said axis and having portitons thereof replaced by balancing elements of material of different density rendering said casing massively symmetrical while maintaining its geometrical symmetry.

JOHN C. GRIFFITH.